Patented Apr. 22, 1941

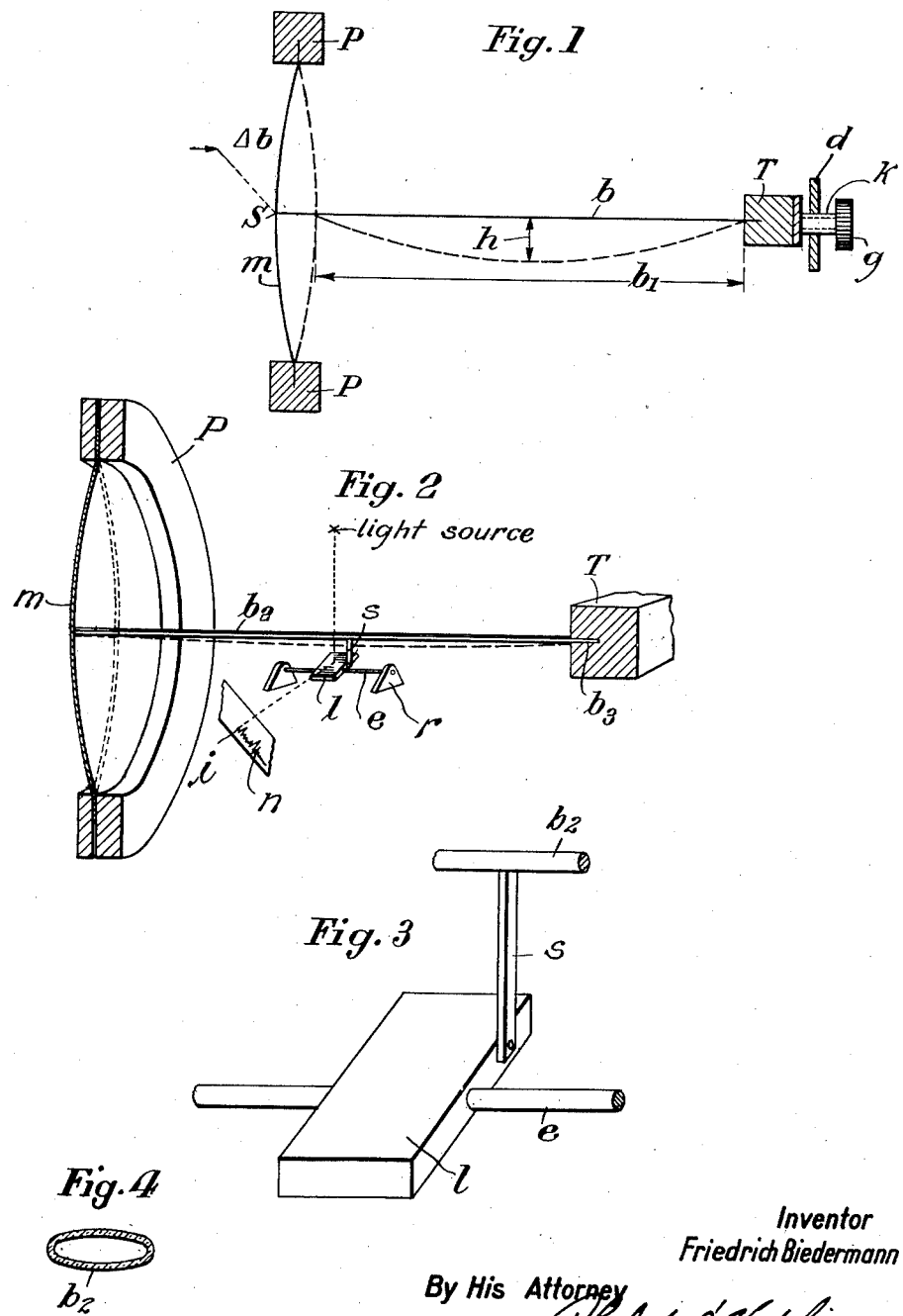

2,239,075

UNITED STATES PATENT OFFICE 2,239,075

APPARATUS FOR PRODUCING PHOTOGRAPHIC SOUND RECORDS

Friedrich Biedermann, Unterhaching, near Munich, Germany, assignor to I. G. Farbenindustrie Aktiengesellschaft, Frankfort-on-the-Main, Germany Application March 2, 1938, Serial No. 193,509
In Germany March 4, 1937

10 Claims. (Cl. 274—5)

My invention relates to an improved apparatus for producing photographic sound records.

Photographic sound records are generally made by transmitting the movements of an oscillating system, for example an armature, a membrane or the like, to an optical device, for example a diaphragm, an oscillating mirror or the like which controls the light producing the record on the film. In order to obtain oscillations of the amplitude which, while in many cases not attained by the mechanical system itself, is necessary for this kind of record, it is usually essential to use some kind of amplifying device, for example an oscillating mirror. This, however, often has the drawback that the mass of the movable mirror and of the mechanism which transmits the oscillations to the mirror produces distortions, particularly in the so-called direct receiving apparatus in which the record on the light-sensitive layer is produced directly, that is without the aid of an amplifier.

It is an object of my invention to avoid this drawback. Another object is to provide a simple apparatus for transmitting the movements of an oscillating mechanical system to the light controlling device.

Another object is the provision of an apparatus in which the bending of a member connected with the oscillating mechanical system is used directly for controlling the beam of light.

Still another object is to provide an apparatus in which the bending member at its point of greatest deflection is connected with a further device for controlling the light whereby a further amplification of the oscillations is attained.

Further objects of my invention will be apparent from the following specification.

Reference is made to the accompanying drawing in which

Fig. 1 is a longitudinal section of a light controlling apparatus,

Fig. 2 is a preferred form of the invention in perspective view and partly in section, Fig. 3 is a fragmentary view on an enlarged scale illustrating the structure of the light controlling device, and Fig. 4 is a cross section of a novel form of the bending member taken on the line 4—4 of Figure 2.

In accordance with the invention the bending member may consist in a wire, bar, tube or the like of which one end is rigidly anchored and the other end is fixed to the membrane or armature which acts as the oscillating mechanical system. As oscillating mechanical systems are here to be understood devices which are moved mechanically by mechanical, acoustical or electrical forces and which transmit their motion to light controlling devices.

The bending bar or wire may be composed of metal in a known manner. For the purpose of the invention, however, non-metallic materials, for example glass and artificial materials resembling glass, have been found to be especially advantageous. Preferably a tubular glass rod is used. If the tube is oval or rectangular in cross section a definite bending direction is obtained as in the case of a metal bar. The advantages of using these novel materials consist mainly in their resistance to corrosion, their elasticity, their low specific gravity and their independence of climatic conditions, for example temperature and humidity.

Referring to the drawing, the oscillating mechanical system consists for example of a membrane $m$ which is rigidly held in the anchoring member P and in its position of rest, that is, when not receiving speech, occupies an approximately straight position. One end of a thin wire or metal bar $b$ is fixed to the center S of the membrane $m$, the other end being anchored in an anchoring block T. When the membrane $m$ is in its position of rest the metal bar or wire $b$ is straight or nearly straight. When the membrane $m$ begins to oscillate, with the amplitude in one direction shown by the dotted line, the wire or bar $b$ bends into the dotted line position, its center being moved through a distance $h$. The maximum deflection of the membrane $m$ is given by $b-b_1=\Delta b$, and is in a definite ratio to the bending $h$ of the bar or wire $b$. This deflection $h$ is the greater the longer the wire or band and the greater the oscillations of the membrane. Nevertheless too great a length of band is disadvantageous for various reasons, for example owing to the natural oscillation of the bar. Theory confirmed by measurements has shown that the magnitude of the deflection $h$ is a multiple of the variation $\Delta b$ in the length of the chord which causes the deflection, and for a given variation in the chord the ratio is greater the smaller the bending. The relationship is approximately expressed by the formula $h=c.\sqrt{b.\Delta b}$, wherein $c$ is a constant and $\Delta b$ denotes the alteration in the length of the chord. This relationship gives a very favorable transmission ratio for the light controlling device to be fixed to the wire or band $b$, so that an intermediate mechanism can be dispensed with.

The apparatus is used for controlling light by fixing the light controlling device to the middle of the bending metal bar and anchoring one end of the bar to the diaphragm or armature.

The bar $b$ shown in Figure 1 need not in practice be straight when in the equilibrium position; in practice an initial bending, which does not, however, affect the behaviour of the apparatus, cannot be avoided. In order further to amplify the oscillations an end of another wire or bar, which is connected with the light controlling device, can be fixed to the middle of the bending wire or bar $b$. To enable initial bending of the bar or wire when it is at equilibrium to be adjusted the position of the anchoring member $T$ is adjustable. In this case support $T$ is carried by a spindle $k$, supported by fixed wall $d$, spindle $k$ being provided with a knob $g$ for moving the spindle and hence the support.

Another form of the invention in which the bending member is a tube of glass or an artificial material resembling glass and having an elliptical cross section is shown, for example, in Figures 2 and 3. Figure 2 shows the membrane $m$ to the center of which is fixed one end of the glass tube $b_2$. The glass tube has the cross section shown in Figure 4 and its other end $b_3$ is anchored rigidly in a block $T$. The light controlling device indicated generally by reference numeral $L$ comprises a base $r$ in which is rotatably journalled the axle $e$. A mirror $l$ is rigidly secured to said axle. Bar $s$ is provided in order to transmit the movement of the bending member to the mirror $l$, said bar having one end connected to the bending member at its point of maximum deflection and having its other end connected to the mirror $l$. It will thus be seen that deflection of the bending member causes rotation of the axle $e$ and hence rotation of mirror $l$.

I claim:

1. In sound recording apparatus the combination of a mechanical system capable of being set in oscillation by sound waves, a fixed support, a single bending member rigidly supported with one end connected with said mechanical system and the other end with said fixed support and capable of being bent by movements of said system, and a light controlling device connected with the point of greatest deflection of said bending member.

2. In sound recording apparatus the combination of a membrane capable of being set in oscillation by sound waves, a fixed support, a single bending member rigidly supported with one end connected with said membrane and the other end with said fixed support and capable of being bent by movements of said membrane, and a light controlling device connected with the point of greatest deflection of said bending member.

3. In sound recording apparatus the combination of a membrane capable of being set in oscillation by sound waves, a fixed support, a single bending member consisting of a wire and rigidly supported with one end connected with said membrane and the other end with said fixed support and capable of being bent by movements of said membrane, and a light controlling device connected with the point of greatest deflection of said bending member.

4. In sound recording apparatus the combination of a membrane capable of being set in oscillation by sound waves, a fixed support, a single bending member consisting of a ribbon and rigidly supported with one end connected with said membrane and the other end with said fixed support and capable of being bent by movements of said membrane, and a light controlling device connected with the point of greatest deflection of said bending member.

5. In sound recording apparatus the combination of a membrane capable of being set in oscillation by sound waves, a fixed support, a single bending member consisting of a non-metallic material and rigidly supported with one end connected with said membrane and the other end with said fixed support and capable of being bent by movements of said membrane, and a light-controlling device connected with the point of greatest deflection of said bending member.

6. In sound recording apparatus the combination of a membrane capable of being set in oscillation by sound waves, a fixed support, a single bending member consisting of glass and rigidly supported with one end connected with said membrane and the other end with said fixed support and capable of being bent by movements of said membrane, and a light controlling device connected with the point of greatest deflection of said bending member.

7. In sound recording apparatus the combination of a membrane capable of being set in oscillation by sound waves, a fixed support, a single bending member consisting of a tube of oval cross section and rigidly supported with one end connected with said membrane and the other end with said fixed support and capable of being bent by movements of said membrane, and a light controlling device connected with the point of greatest deflection of said bending member.

8. In sound recording apparatus the combination of a membrane capable of being set in oscillation by sound waves, a fixed support, a single bending member consisting of a tube of rectangular cross section and rigidly supported with one end connected with said membrane and the other end with said fixed support and capable of being bent by movements of said membrane, and a light controlling device connected with the point of greatest deflection of said bending member.

9. In sound recording apparatus the combination of a mechanical system capable of being set in oscillation by sound waves, a single bending member capable of being bent by movements of said system, a rigid anchoring member, one end of said bending member being fixed to said mechanical system and the other end to said anchoring member, the position of said anchoring member being adjustable, and a light controlling device connected with the point of greatest deflection of said bending member.

10. In sound recording apparatus, the combination of a mechanical system capable of being set in oscillation by sound waves, a single bending member rigidly supported at right angles to said system with one end thereof connected to said system and the other end connected to a rigid support and adapted to be bent at a point midway between its ends by the compressive force set up by the oscillation of said mechanical system and a light controlling device carried by said bending member at the point of greatest deflection of said member.

FRIEDRICH BIEDERMANN.